US010255910B2

(12) United States Patent
Yaghi et al.

(10) Patent No.: US 10,255,910 B2
(45) Date of Patent: Apr. 9, 2019

(54) CENTERED, LEFT- AND RIGHT-SHIFTED DEEP NEURAL NETWORKS AND THEIR COMBINATIONS

(71) Applicant: Apptek, Inc., McLean, VA (US)

(72) Inventors: Mudar Yaghi, McLean, VA (US); Hassan Sawaf, Los Gatos, CA (US); Jinato Jiang, Great Falls, VA (US)

(73) Assignee: AppTek, Inc., McLean, VA (US)

( * ) Notice: Subject to any disclaimer, the term of this patent is extended or adjusted under 35 U.S.C. 154(b) by 53 days.

(21) Appl. No.: 15/707,562

(22) Filed: Sep. 18, 2017

(65) Prior Publication Data

US 2018/0082677 A1 Mar. 22, 2018

Related U.S. Application Data

(60) Provisional application No. 62/395,823, filed on Sep. 16, 2016.

(51) Int. Cl.
*G10L 15/16* (2006.01)
*G06N 3/08* (2006.01)
*G06N 3/04* (2006.01)

(52) U.S. Cl.
CPC ............ *G10L 15/16* (2013.01); *G06N 3/0454* (2013.01); *G06N 3/08* (2013.01)

(58) Field of Classification Search
USPC ....................................................... 704/232
See application file for complete search history.

(56) References Cited

U.S. PATENT DOCUMENTS 5,263,107 A * 11/1993 Ueda .................... G06K 9/4628
382/157
2014/0278426 A1 * 9/2014 Jost ........................ G10L 15/063
704/257

(Continued)

OTHER PUBLICATIONS

Seide et al.; Feature Engineering in Context-Dependent Deep Neural Networks for Conversational Speech Transcription; 2011 IEEE Workshop on Automatic Speech Recognition & Understanding; pp. 24-29. (Year: 2011).*

*Primary Examiner* — Abul K Azad
(74) *Attorney, Agent, or Firm* — Morgan, Lewis & Bockius LLP; Robert C. Bertin; Rachael Lea Leventhal

(57) ABSTRACT

Deep Neural Networks (DNN) are time shifted relative to one another and trained. The time-shifted networks may then be combined to improve recognition accuracy. The approach is based on an automatic speech recognition (ASR) system using DNN and using time shifted features. Initially, a regular ASR model is trained to produce a first trained DNN. Then a top layer (e.g., SoftMax layer) and the last hidden layer (e.g., Sigmoid) are fine-tuned with same data set but with a feature window left- and right-shifted to create respective second and third left-shifted and right-shifted DNNs. From these three DNN networks, four combination networks may be generated: left- and right-shifted, left-shifted and centered, centered and right-shifted, and left-shifted, centered, and right-shifted. The centered networks are used to perform the initial (first-pass) ASR. Then the other six networks are used to perform rescoring. The resulting are combined using ROVER (recognizer output voting error reduction) or another technique to improve recognition performance as compared to the centered DNN by itself.

19 Claims, 9 Drawing Sheets

(56) References Cited

U.S. PATENT DOCUMENTS

| | | | | |
|---|---|---|---|---|
| 2015/0100530 A1* | 4/2015 | Mnih | .................... | G06N 3/0454 |
| | | | | 706/25 |
| 2016/0078339 A1* | 3/2016 | Li | ......................... | G06N 3/084 |
| | | | | 706/20 |
| 2016/0171974 A1* | 6/2016 | Hannun | ................ | G10L 15/063 |
| | | | | 704/232 |
| 2016/0322055 A1* | 11/2016 | Sainath | ................... | G10L 15/16 |

* cited by examiner

| FIG 6A | FIG 6B | FIG 6C | FIG 6D |

CENTERED, LEFT- AND RIGHT-SHIFTED DEEP NEURAL NETWORKS AND THEIR COMBINATIONS

CROSS REFERENCE TO RELATED APPLICATIONS

This application is related to earlier filed U.S. Provisional Patent Application No. 62/395,823 filed on Sep. 16, 2016 and entitled CENTERED, LEFT- AND RIGHT-SHIFTED DEEP NEURAL NETWORKS AND THEIR COMBINATION. The applicants claim priority to this application, which is incorporated by reference in its entirety herein.

FIELD OF THE INVENTION

The present invention relates generally to speech recognition and, more particularly, to systems and methods for speech recognition based on time shifted models and deep neural networks (DNN).

BACKGROUND OF THE INVENTION

Automatic speech recognition (ASR) technology has advanced rapidly with increasing computing power available in devices of all types. It remains, however, a computationally intensive activity. There remains a need to process speech using neural networks and other architectures that can be efficiently trained based on available resources.

SUMMARY OF THE INVENTION

According to an embodiment of the present invention, Deep Neural Networks (DNN) are time shifted relative to one another and trained. The time-shifted networks may then be combined to improve recognition accuracy. The approach is based on an automatic speech recognition (ASR) system using DNN.

Initially, a regular ASR model is trained. Then a top layer (e.g., SoftMax layer) and the last hidden layer (e.g., Sigmoid) may be fine-tuned with same data set but with a feature window left- and right-shifted. That is, for a regular DNN training, the feature window takes n frames from the left and n frames from the right. In this approach, one fine-tuning (left-shifted) takes (n+n/2) frames from left and (n−n/2) frames from the right, and the other fine-tuning (right-shifted) takes (n−n/2) frames from the left and (n+n/2) frames from the right. In this way, we have the left-shifted networks, the regular networks (centered), and right-shifted networks. From these three networks, four combination networks may be generated: left- and right-shifted, left-shifted and centered, centered and right-shifted, and left-shifted, centered, and right-shifted. The centered networks are used to perform the initial (first-pass) ASR. Then the other six networks are used to perform rescoring. The resulting lattices may then be combined using ROVER (recognizer output voting error reduction) to improve recognition performance.

According to one embodiment of the invention, a system for training deep neural networks using centered and time shifted features includes a memory and a processor. The memory includes program instructions for training DNN models, preparing automatic speech recognition features and aligning units using left-shifted, centered and right-shifted features and storing audio and transcription data for training. The processor is coupled to the memory for executing the program instructions to generate: a first DNN having a plurality of layers based on the centered data, a second DNN based on the first DNN that shares the same number of layers as the first DNN and shares at least two bottom layers with the first DNN and in which the remaining layers are trained using the left-shifted features in the memory, and a third DNN based on the first DNN that shares the same number of layers as the first DNN and shares at least two bottom layers with the first DNN and in which the remaining layers are trained using the right-shifted features in the memory. The processor according to one embodiments further receives the features, audio and transcription data and assigns corresponding data to levels of the first, second and third DNN to creates trained first, second and third DNN networks that when combined produce a combined trained network transcription output for audio inputs.

According to another embodiment of the invention, processor further executes the program instructions, and processes an audio file to create a first-pass recognition lattice corresponding to the first DNN and subsequently re-scores the lattices based on the second and third DNNs and their combination with the first DNN. The program instructions in the memory further include program instructions for combining the first, second and third DNNs, including based on scoring using ROVER.

According to still other embodiments, the second DNN may be based on left-shifted features that are shifted to the left more than the right-shifted features are shifted to the right for the corresponding third DNN. The third DNN may be based on right-shifted features that are shifted to the right more than the left shifted features are shifted to the left for the corresponding second DNN. Alternatively, the right-shifted and the left-shifted features may be shifted the same amount in time.

According to still another embodiments of the invention, a method for training deep neural networks using centered and time shifted features includes: preparing a deep neural network (DNN) for automatic speech recognition based on automatic speech recognition features, audio data, transcript data, lexicon and phonetic information; training a first DNN having a plurality of layers from an automatic speech recognition training tool based on the features centered in time; preparing left-shifted features and right-shifted features; fine-tuning the top two of the layers of the first trained DNN based on the left-shifted and right shifted features to create second and third respective trained DNNs sharing the bottom layers with the first DNN and each having its own respective top layers; using the first DNN for a first pass recognition on audio data; and combining the second and third DNNs with the first DNN to re-score the transcription of audio and combine the output of the first, second and third DNNs to increase the accuracy compared to the using the first DNN only.

According to still another embodiment of the invention, a computer program product includes a non-transitory computer usable medium having computer program logic therein, the computer program logic includes configuring logic, receiving logic, shifting logic training logic, conducting logic and combining logic. The configuring logic causes the computer to configure at least three deep neural networks (DNNs) each having a plurality of levels to be trained for transcribing audio data. The receiving logic causes the computer to receive audio data and transcription data corresponding to the audio. The shifting logic causes the computer to prepare features based on left-shifted, centered and right-shifted timing. The training logic causes the computer to train a first one of the DNN networks based on features having centered timing. The conducting logic causes the computer to conduct iterative training to create a second DNN based on the features having left-shifted time and a third DNN based on the features having right-shifted timing and the combining logic for causes the computer to combine outputs from the first, second and third DNN to create a combined trained DNN that has increased accuracy compared to the using the first DNN only. The outputs of the first, second and third DNN may be combined using at least one of averaging, maximum or training additional neural network layers.

BRIEF DESCRIPTION OF THE FIGURES

The above described features and advantages of the invention will be more fully appreciated with reference to the appended drawing figures, in which.

DETAILED DESCRIPTION

Figure 1:
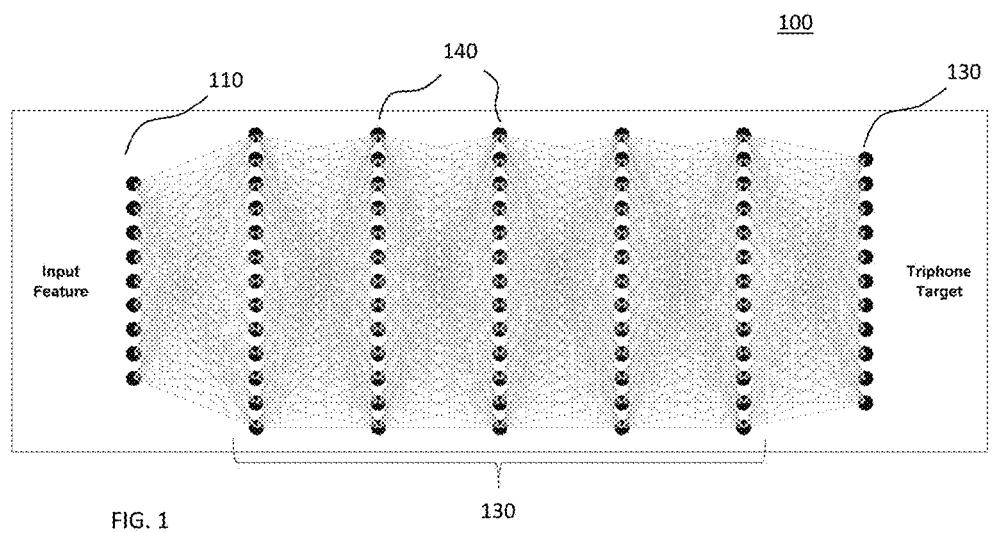
FIG. 1 depicts an illustrative image of a DNN network.

An approach to training time-shifted deep neural networks (DNN) and combining these time-shifted networks is described herein. The approach is based on an automatic speech recognition (ASR) system using DNN. FIG. 1 depicts an illustrative DNN network structure 100. Referring to FIG. 1, DNN includes an input feature layer 110, the hidden layers 120, and a triphone target output layer 130. Each layer includes a plurality of nodes 140 and between layers, all nodes 140 are connected.

Initially, a regular ASR model is trained. Then a top layer (e.g., SoftMax layer) and the last hidden layer (e.g., Sigmoid) may be fine-tuned with same data set but with a feature window left- and right-shifted. That is, for a regular DNN training, the feature window takes n frames from the left and n frames from the right. In this approach, one fine-tuning (left-shifted) takes (n+n/2) frames from left and (n−n/2) frames from the right, and the other fine-tuning (right-shifted) takes (n−n/2) frames from the left and (n+n/2) frames from the right. In this way, the left-shifted networks, the regular networks (centered), and right-shifted networks are available to contribute to the output. From these three networks, four combination networks may be generated: left- and right-shifted, left-shifted and centered, centered and right-shifted, and left-shifted, centered, and right-shifted. The centered networks are used to perform the initial (first-pass) ASR. Then the other six networks are used to perform rescoring. The resulting lattices may then be combined using an error reduction technique or optimization technique such as recognizer output voting error reduction ("ROVER") to improve recognition performance.

One can use available tools to train a deep neural networks (DNN) triphone model using Kaldi, RWTH ASR, or other Toolkits, which have standard components like DNN, triphone, linear discrimination analysis ("LDA"), etc. To train a DNN triphone model, audio and corresponding transcription is needed. Other DNN models may be used in some embodiments, for example Long Short Term Memory (LSTM) neural networks, convolutional neural networks (CNN) or recurrent neural networks (RNN) may be used, among others. This type of data can be obtained from LDA or other channels. In addition, word pronunciations are needed. One can use the CMU pronunciation dictionary for this purpose. For an out-of-vocabulary word, generally a grapheme-to-phoneme tool is used to predict the out-of-vocabulary word's pronunciation. To train a triphone model, linguistic grouping may be prepared. This can be obtained from standard linguistic text books with groupings such as voicing, labial, dental, plosive, etc.

In one example of an embodiment of the invention, a RWTH ASR Toolkit may be used along with audio data having associated transcriptions. Illustrative data may also include word pronunciations data, a RWTH grapheme-to-phoneme conversion tool, and a general linguistic question list. For example, there may be 4501 classes in the triphone decision tree grouping. The audio has a 16 kHz sampling rate for this example but may be any rate. The acoustic features are standard MFCC features, which have a frame size of 25 ms, a frame shift of 10 ms, and output size of 16 coefficients per frame. MFCC features are transformed with LDA with a window size of 9 frames and an output size of 45. The initial acoustic models may be trained with traditional GMM modeling to obtain the alignment and triphone groupings, and LDA transformation.

Figure 2:
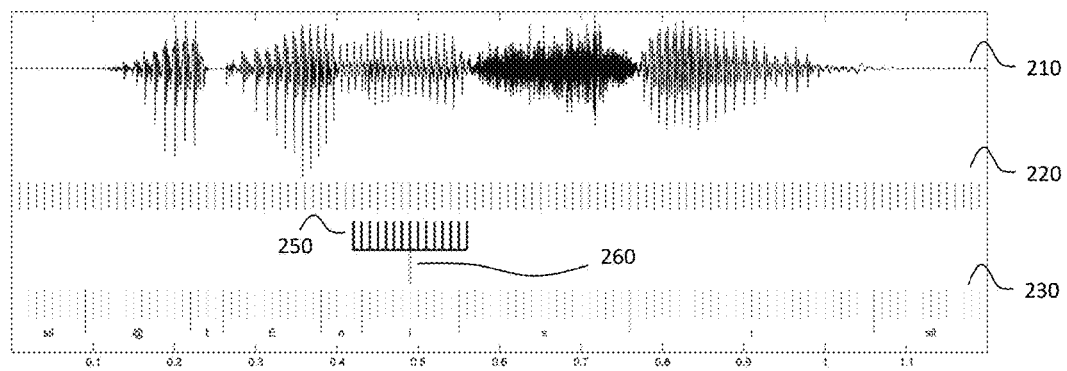
FIG. 2 depicts an illustrative image of an alignment that corresponds to an audio file, a feature series, and phoneme alignments that may be generated according to one illustrative embodiment of the invention.

FIG. 2 depicts an illustrative image of an alignment that corresponds to an audio file 210, a feature series 220, and phoneme alignments 230 that may be generated according to one illustrative embodiment of the invention. Referring to FIG. 2, the horizontal axis is represented by time in seconds and the vertical axis is divided into three sections: The audio waveform (top) 210, the feature vectors (middle) 220, and the phoneme alignments (bottom) 230. Referring to FIG. 1, the symbols (sil, @, t, E, n, etc.) are phoneme representations. The vertical long bars among the phoneme alignments 230 indicate boundaries between phonemes. In between the feature vectors and phoneme alignments, 15 bars 250 and one bar 260 symbolize that at one time frame, a phoneme corresponds to 15 consecutive feature frames during the training. In FIG. 2, these 15 features are centered at the time frame: 7 frames on the left and 7 frames on the right of bar 260. The overall image is a display of the time-centered features frames and phoneme alignment for DNN model training.

For example, after the initial modeling, fifteen consecutive LDA features (7 frames from the left and 7 frames from the right as shown in FIG. 2) are concatenated to form a 675 dimension vector per frame. The concatenated features in this example may be first mean and variance normalized and then fed to the DNN training. It will be understood that the window size and output size may be changed, along with the dimensionality of the vectors.

The DNN model may be trained first with supervised pre-training and then is followed by fine-tuning. According to one illustrative example, the DNN has five hidden layers 120 with 1280 nodes each. The output SoftMax layer has 3500 nodes. The training is performed on a CUDA-enabled GPU machine. Both Kaldi and RWTH toolkits provide recipes for supervised pre-training and fine-tuning. In pre-training, the first hidden layer is trained and fixed; then the second hidden layer is added, trained, and fixed; so on and so forth. During fine-tuning, the DNN learning rate is controlled using a Newbob protocol. After each iteration, the new DNN model is evaluated against a development data set on the frame classification error. The new learning rate depends on the improvement on the frame classification error; and the fine-tuning stops when the improvement is very small. It will be understood this is only one example and that more or fewer layers may be used and the number of nodes may be changed as desired and depending on the application.

Left- and Right-Shifted DNN Networks

Figure 3:
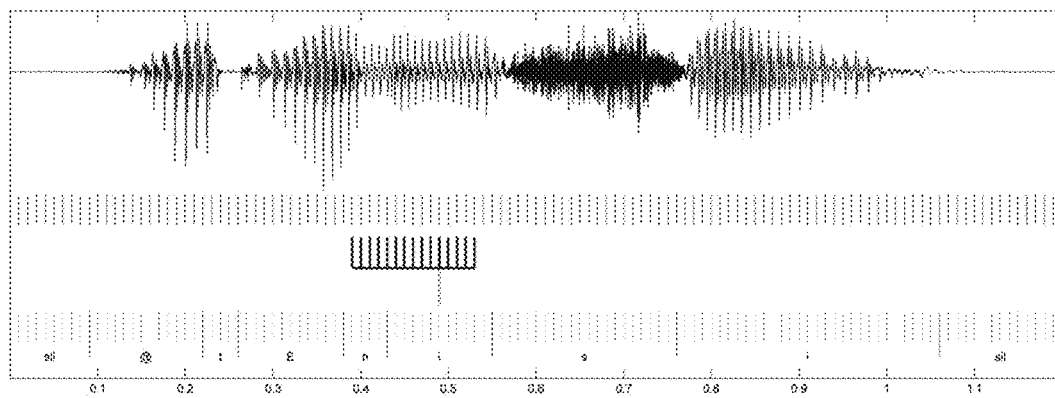
FIG. 3 depicts a network with left-shifted features according to an embodiment of the invention.
Figure 4:
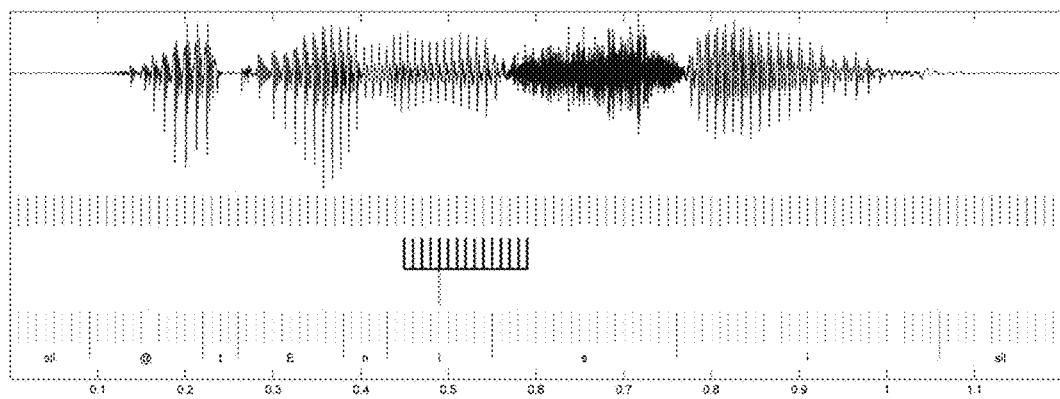
FIG. 4 depicts a network with right-shifted features according to an embodiment of the invention.

FIG. 3 is similar to FIG. 2 except that the features 220 used in DNN model training are left-shifted. That is, there are 10 frames on the left of bar 260 and 4 frames on the right of bar 260 in reference to the phoneme time frame. FIG. 4 is similar to FIG. 2 except that the features 220 used in DNN model training are right-shifted. That is, there are 4 frames on the left of bar 260 and 10 frames on the right of bar 260 in reference to the phoneme time frame.

For the left- and right-shifted DNN training, according to one embodiment of the invention, fine-tuning of the top two layers (the last hidden layer and the top layer) is performed using time shifted features. Specially, the left-shifted training takes 10 frames from the left and 4 frames from the right (see FIG. 3); and the right-shifted training takes 4 frames from the left and 10 frames from the right (see FIG. 4).

Figure 5A:
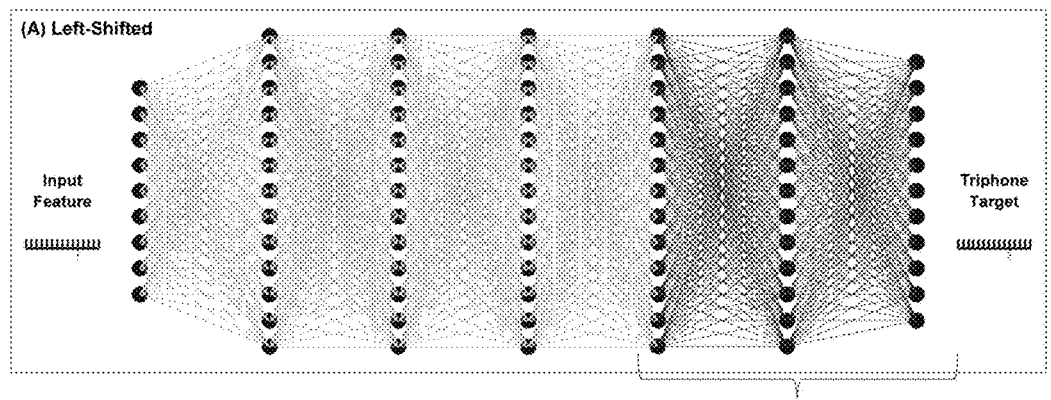
FIG. 5A depicts a network in which the top two layers are trained (fine-tuned) and the input features are left-shifted according to an embodiment of the invention.
Figure 5B:
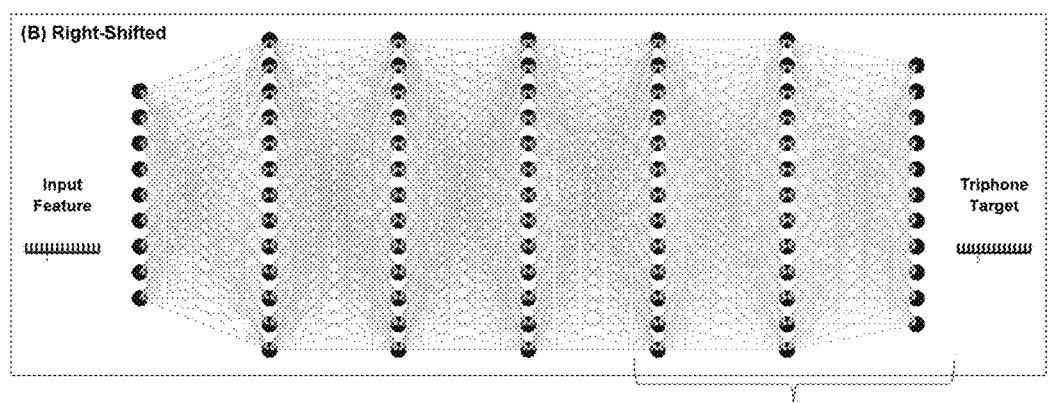
FIG. 5B depicts a network in which only the top two layers are trained (fine-tuned) and the input features are right-shifted according to an embodiment of the invention.

FIGS. 5A and 5B highlight that according to one embodiment of the invention, the last two layers may be trained using respectively the left-shifted and the right-shifted features. FIGS. 5A and 5B are similar to FIG. 1 except that in FIG. 5(A) only the top two layers 510 are trained (fine-tuned) and the input features are left-shifted, and in FIG. 5(B) only the top two layers 520 are trained (fine-tuned) and the input features are right-shifted. Both of the left-shifted and right-shifted networks shown in FIGS. 5A and 5B use the regular trained networks as the initial parameters. Instead of taking equal numbers of frames from the left and the right, this approach takes uneven numbers of frames from the left and the right. It will be understood, however, this this example is illustrative and that more or fewer layers may be used for training the left and right shifted networks. For example, the top 1, 2, 3, 4 or more layers may be used in some embodiments for training depending on implementation.

Combining the Left-Shifted, Centered, and Right-Shifted Networks

The regular centered DNN model is used for the first-pass recognition. To perform the ASR, one needs to prepare a language model and a lexicon. One can download text data from websites (e.g., CNN, Yahoo News, etc.). After that, language modeling tools SRILM or IRSTLM can be used. Lexicon can be prepared similarly as in the training, which uses a lexicon dictionary and using a grapheme-to-phoneme tool.

Figure 6A:
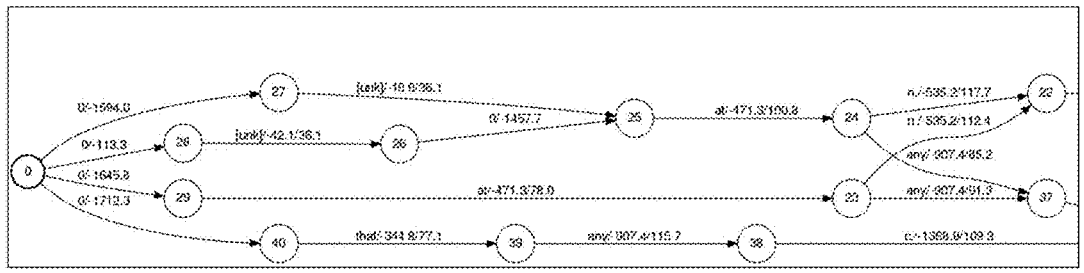
FIG. 6 and its constituent parts 6A-6D depict an illustrative output for the recognition of an audio files or streams according to an embodiment of the present invention.
Figure 6B:
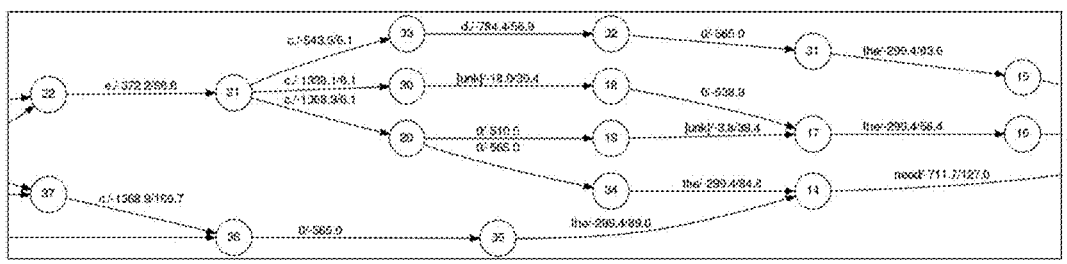
Figure 6C:
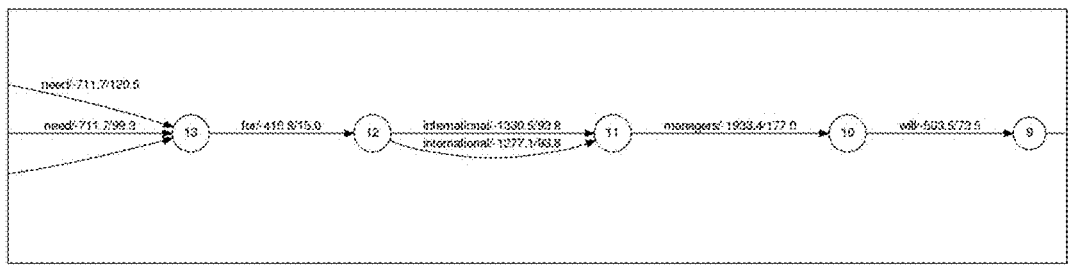
Figures 6, 6D:
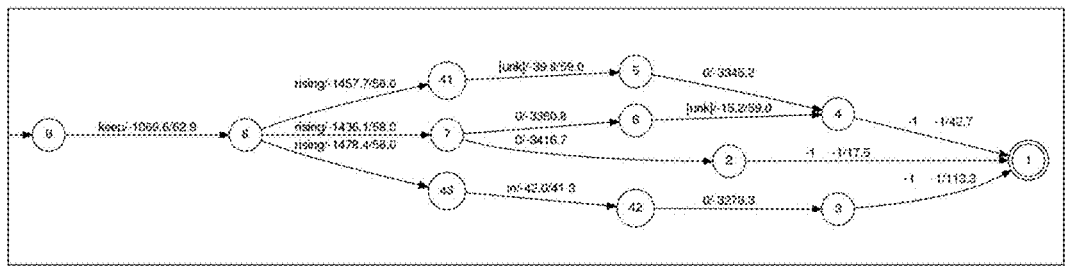

FIG. 6 and its component parts FIGS. 6A-6D depict an example output for a recognition of audio files or streams according to an embodiment of the present invention. Referring to FIG. 5, the horizontal axis is represented by time. That is, the position of a node on the horizontal axis represents its time in the audio file (from left to right). There are candidate recognition results for an audio file or stream. These nodes are interconnected, and they form different paths (arcs) from the start to the end. Each path represents one hypothesis relating to the corresponding audio. For each arc, according to one illustrative embodiment, there is an input word, an acoustic score, and a language model score in the format of "word/score1/score2" and timing information. The best path is selected based on the scores (acoustic and language) associated with each word. Usually the ASR output includes the top best recognition results and lattices.

Figure 7:
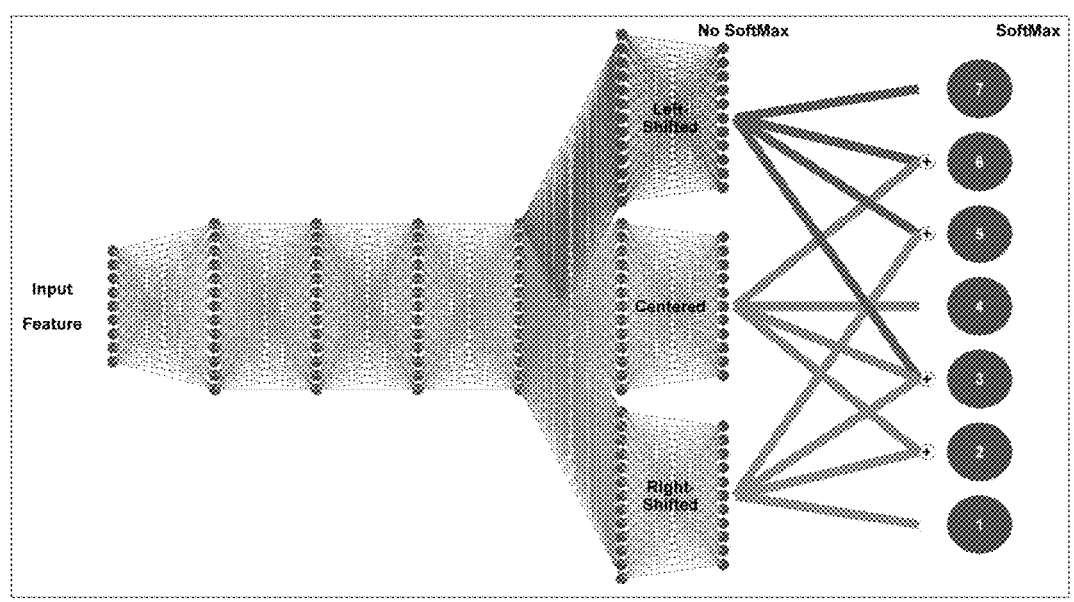
FIG. 7 depicts combinations of the outputs of centered, left-shifted and right-shifted DNN networks according to an embodiment of the invention.

FIG. 7 depicts an illustrative computation of the DNN networks and their combination. The center networks are the regular (centered) trained networks, the top networks are the left-shifted networks, and bottom networks are the right-shifted networks. The computation of the first four hidden layers of the network is shared. After computation of the left-shifted, centered, and right-shifted networks, their outputs are combined, for example as shown. The combination operation can handled in a variety of ways and for example, could be based on an average, maximum, or an additional trained combination neural layer.

After the initial recognition, the left-shifted and right-shifted network outputs (acoustic scores) are computed (see FIG. 7). Because the left-shifted and right-shifted networks share several layers (except the top two layers) with the centered networks, the intermediate network outputs can be shared. This approach incurs only four layers of additional computation (two for left-shifted and two for the right-shifted). The computation of output may be done with a SoftMax computation. For example, for the combination of the left-shifted, centered, and right-shifted networks, these scores (without SoftMax) are averaged and then SoftMax is applied. According to this embodiment, minimal computation is incurred to produce the combination acoustic scores.

Using these different types of scores, the lattice can be re-scored, and new lattices produced. These lattices in the end are combined using the standard ROVER (Recognition Output Voting Error Reduction) approach (see FIGS. 8 and 9). Alternatively, using these different types of scores, new lattices can be generated in a regular recognition process. To speed up these recognition processes, the language model can be derived from the first-pass lattice produced earlier. Again, these lattices in the end are combined using the standard ROVER approach.

Figure 8:
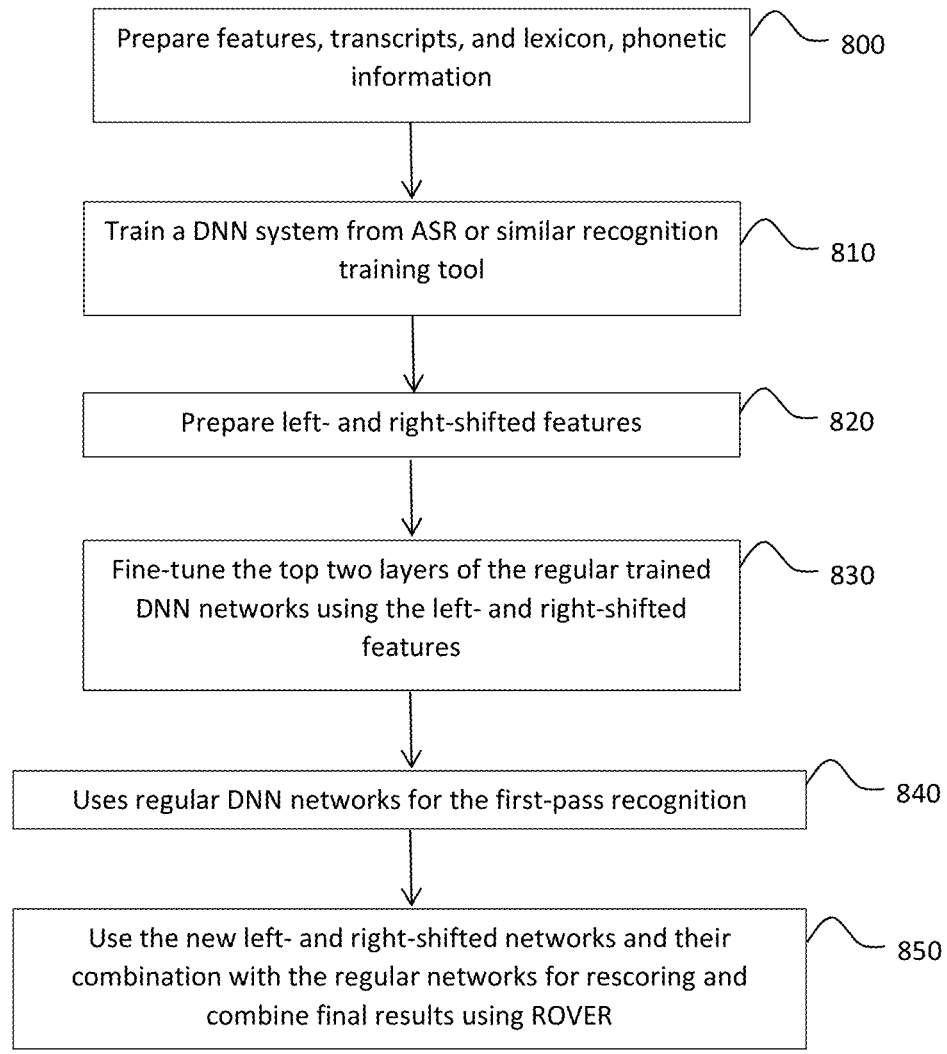
FIG. 8 depicts a method of training for the left-shifted, right-shifted DNNs and in turn applying the training results to an illustrative recognition process according to an embodiment of the invention.

FIG. 8 depicts a method of training for the left-shifted, right-shifted DNNs and in turn applying the training results to a recognition process. Referring to FIG. 8, in 800 features, audio and corresponding transcripts, lexicon and phonetic information are prepared in order to train a DNN. In 810, a DNN network is trained from ASR or a similar recognition training tool based on the audio and transcripts. In 820, the left and right shifted features are then prepared as described above for the top two layers (but more or fewer may be chosen). In 830, the top two layers (or more or fewer depending on implementation) of the regular trained DNN networks are fine tuned using the left and right shifted features. In 840, the regular DNN network is used for first pass recognition. In 850, the left and right shifted networks and their combination with the regular networks are used for rescoring and combining final results using ROVER to realize a more accurate DNN system.

Figure 9:
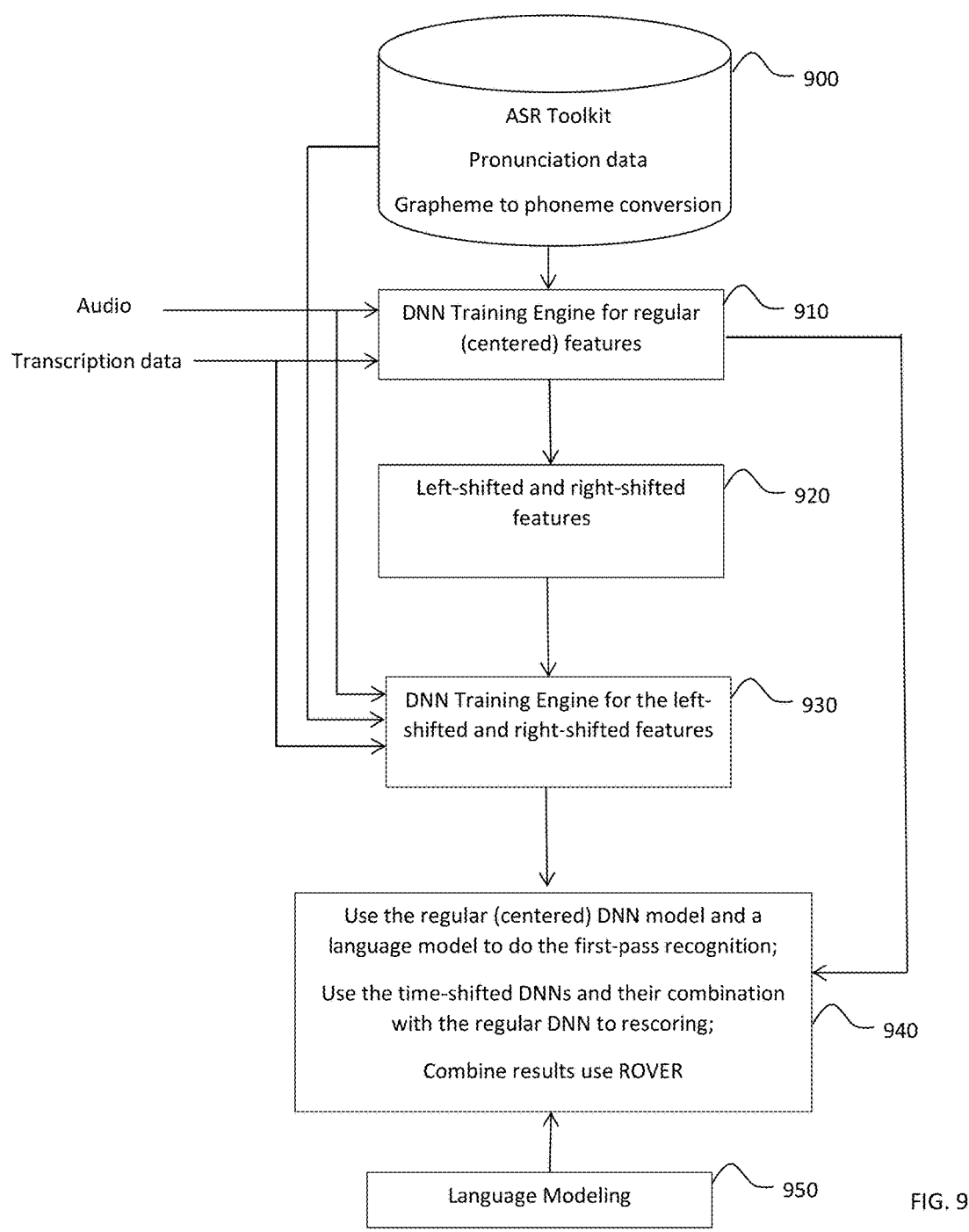
FIG. 9 depicts an illustrative system for training using DNN using the left-shifted, centered, and right-shifted features according to an embodiment of the invention.

FIG. 9 depicts an illustrative system for training using DNN using the left-shifted, centered, and right-shifted features. Referring to FIG. 9, a frame based DNN receives inputs that may be stored in one or more databases 900 including, for example audio inputs corresponding to an audio stream, transcripts transcribing the audio stream with timing information and various other inputs including ASR data and toolkits, and pronunciation data. The pronunciation data may further be prepared using tools such as grapheme to phoneme conversion tools. The DNN and other tool kits may also be stored in the databases 900 and may be stored locally or remotely and be accessible over a network. The databases may be accessed by a server or other computer that includes a processor and memory. The memory (including the database) may also store the data, the toolkits and the various inputs, including the audio and transcription inputs. The memory and processor may also implement the neurons of the neural networks that are set up and fine-tuned according to the techniques described herein.

A DNN training engine 910 may be coupled to the database (or memory) 900 and receive audio and transcription data. The training engine 910 may output left shifted and right shifted features 920. A DNN training engine 930 may then operate on the left-shifted and right-shifted features, the audio and transcription data and the database 900 to produce a set of trained DNN networks including the left shifted and right shifted DNN networks shown in FIGS. 5A and 5B. The processor executes program instructions to run the various programs based on the inputs to achieve trained DNN networks using the left-shifted, centered, and right-shifted features. The combined DNN training engine 940 uses the centered DNN network to do a first pass recognition on an audio stream with corresponding transcript. It then uses the time shifted DNN networks and their combination with the regular DNN to produce additional scoring results. The results are combined using Rover or another technique described herein. The combined DNN engine may also integrate language modeling data 950 to facilitate scoring, rescoring and combining the outputs to produce a combined recognition result.

Once trained, the trained networks may then be used to process new audio or other files to facilitate scoring translations of words or their constituent parts in a stand-alone translation or to annotate translations being done using a frame based DNN approach, for example, to improve and acoustically re-score and to combine results into traditional ASR techniques. By training with left shifted and right shifted features, in addition to centered features, the training is augmented with variations of data that enable better discrimination and accuracy improvement in the overall trained network.

Figure 10:
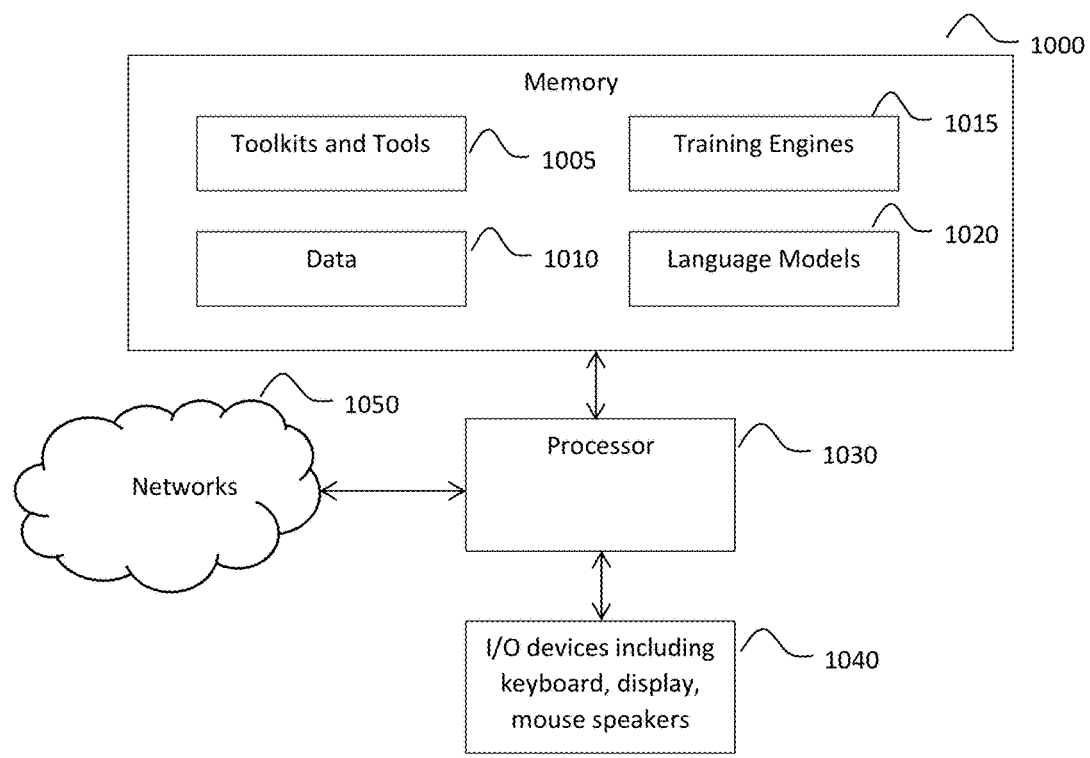
FIG. 10 depicts an illustrative system for implementing systems and methods described herein according to an embodiment of the invention.

FIG. 10 depicts an illustrative server or computer system for implementing systems and methods described herein according to an embodiment of the invention. For example, referring to FIG. 10, a processor 1030 is coupled to a memory 1000, input/out devices 1040 including illustratively, for example, a keyboard, mouse, display, microphone, and speaker and to a network 1050. The memory 1000 includes computer program instructions stored therein that may be accessed and executed by the processor 1030 to cause the processor to create the DNN structures, load data and tool kits into memory from databases such as database 900 or from a network 1050, executed the tool kits, perform DNN training, create left-shifted and right-shifted feature sets and perform the methods and additional DNN training on time shifted features and output combinations described herein. In this regard, for example, the memory 1000 may include toolkits and tools 1005 that may be resident in memory or may be store in database 900, program instructions to implement training engines 1015 for training centered, left-shifted, right-shifted or combined networks as described according to embodiments of the present invention, language models 1020 and data 1010 associated with inputs, the training process or outputs or associated with using a trained, combined DNN as described transcribing audio input received, for example, from a network 1050.

While particular embodiments of the present invention have been shown and described, it will be understood by those having ordinary skill in the art that changes may be made to those embodiments without departing from the spirit and scope of the present invention.

What is claimed is:

1. A system for training deep neural networks using centered and time shifted features, comprising:
   a memory, including program instructions for training deep neural network (DNN) models, preparing automatic speech recognition features and aligning units using left-shifted, centered and right-shifted features and storing audio and transcription data for training; and
   a processor coupled to the memory for executing the program instructions to generate: a first DNN having a plurality of layers based on the centered data, a second DNN based on the first DNN that shares the same number of layers as the first DNN and shares at least two bottom layers with the first DNN and in which the remaining layers are trained using the left-shifted features in the memory, and a third DNN based on the first DNN that shares the same number of layers as the first DNN and shares at least two bottom layers with the first DNN and in which the remaining layers are trained using the right-shifted features in the memory, and
   wherein the processor further receives the features, audio and transcription data and assigns corresponding data to levels of the first, second and third DNN to creates trained first, second and third DNN networks that when combined produce a combined trained network transcription output for audio inputs.

2. The system according to claim 1, wherein the processor further executes the program instructions, and processes an audio file to create a first-pass recognition lattice corresponding to the first DNN and subsequently re-scores the lattices based on the second and third DNNs and their combination with the first DNN.

3. The system according to claim 2, wherein the program instructions in the memory further include program for combining the first, second and third DNNs.

4. The system according to claim 3, wherein the combining is used for scoring based on ROVER.

5. The system according to claim 1, wherein the second DNN is based on left-shifted features that are shifted to the left more than the right-shifted features are shifted to the right for the corresponding third DNN.

6. The system according to claim 1, wherein the third DNN is based on right-shifted features that are shifted to the right more than the left shifted features are shifted to the left for the corresponding second DNN.

7. The system according to claim 1, wherein the right-shifted and the left-shifted features are shifted the same amount in time.

8. The system according to claim 1, wherein the processor is part of a DNN engine that is capable of configuring one or more deep neural networks populated with multiple layers of neurons based on ASR toolkits, and pronunciation data.

9. A method for training deep neural networks using centered and time shifted features, comprising:
preparing a deep neural network (DNN) for automatic speech recognition based on automatic speech recognition features, audio data, transcript data, lexicon and phonetic information;
training a first DNN having a plurality of layers from an automatic speech recognition training tool based on the features centered in time;
preparing left-shifted features and right-shifted features;
fine-tuning the top two of the layers of the first trained DNN based on the left-shifted and right shifted features to create second and third respective trained DNNs sharing the bottom layers with the first DNN and each having its own respective top layers;
using the first DNN for a first pass recognition on audio data; and
combining the second and third DNNs with the first DNN to re-score the transcription of audio and combine the output of the first, second and third DNNs to increase the accuracy compared to the using the first DNN only.

10. The method according to claim 9, wherein the outputs of the first, second and third DNN are combined based on ROVER.

11. The method according to claim 9, wherein the second DNN is based on left-shifted features that are shifted to the left more than the right-shifted features are shifted to the right for the corresponding third DNN.

12. The method according to claim 9, wherein the third DNN is based on right-shifted features that are shifted to the right more than the left shifted features are shifted to the left for the corresponding second DNN.

13. The method according to claim 9, wherein the right-shifted and the left-shifted features are shifted the same amount in time.

14. A computer program product comprising a non-transitory computer usable medium having computer program logic therein, the computer program logic comprising:
configuring logic for causing the computer to configure at least three deep neural networks (DNNs) each having a plurality of levels to be trained for transcribing audio data;
receiving logic for causing the computer to receive audio data and transcription data corresponding to the audio;
shifting logic for causing the computer to shift features based on left-shifted, centered and right-shifted timing;
training logic for causing the computer to train a first one of the DNN networks based on features having centered timing;
conducting logic for causing the computer to conduct iterative training to create a second DNN based on the features having left-shifted time and a third DNN based on the features having right-shifted timing; and
combining logic for causing the computer to combine outputs from the first, second and third DNN to create a combined trained DNN that has increased accuracy compared to the using the first DNN only.

15. The computer program product according to claim 13, wherein the second DNN is based on left-shifted features that are shifted to the left more than the right-shifted features are shifted to the right for the corresponding third DNN.

16. The computer program product according to claim 13, wherein the third DNN is based on right-shifted features that are shifted to the right more than the left shifted features are shifted to the left for the corresponding second DNN.

17. The computer program product according to claim 13, wherein the right-shifted and the left-shifted features are shifted the same amount in time.

18. The computer program product according to claim 13, wherein the outputs of the first, second and third DNN are combined using at least one of averaging, maximum or training additional neural network layers.

19. The computer program product according to claim 13, wherein the outputs of the first, second and third DNN are combined based on ROVER.

* * * * *